UNITED STATES PATENT OFFICE.

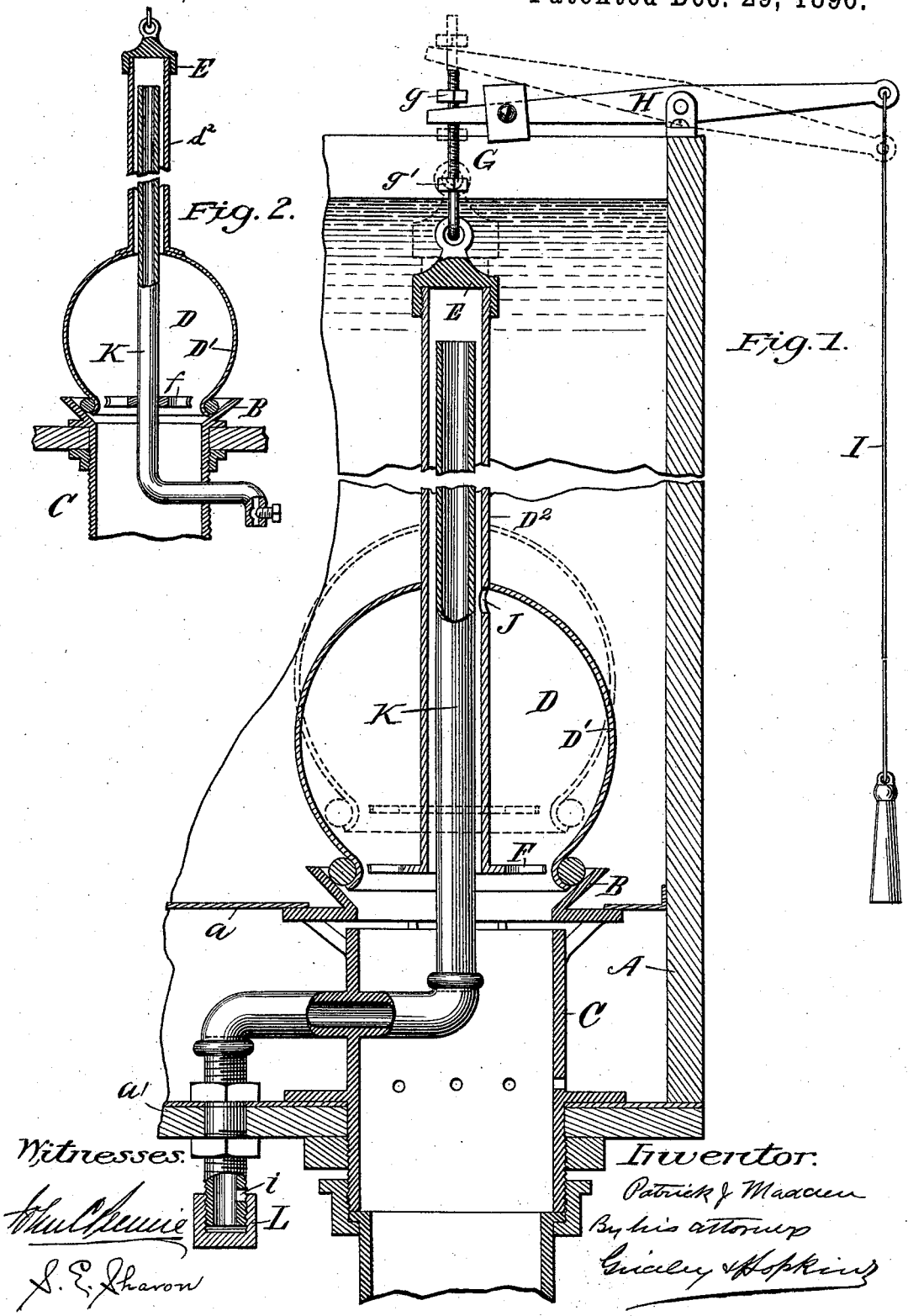

PATRICK J. MADDEN, OF CHICAGO, ILLINOIS.

FLUSHING ATTACHMENT FOR WATER-CLOSETS.

SPECIFICATION forming part of Letters Patent No. 574,367, dated December 29, 1896.

Application filed March 25, 1896. Serial No. 584,889. (No model.)

*To all whom it may concern:*

Be it known that I, PATRICK J. MADDEN, a citizen of the United States, residing at Chicago, in the county of Cook and State of Illinois, have invented certain new and useful Improvements in Flushing Attachments for Water-Closets, of which the following is a specification, reference being had to the accompanying drawings, which are made a part hereof, and in which—

Figure 1 is a sectional elevation of a flushing attachment embodying the invention in its preferred form. Fig. 2 is a sectional elevation of a flushing attachment embodying the invention in a simpler form.

The present invention relates to that class of flushing attachments which have a water-tank, provided at bottom with an outlet, a hollow valve for closing the outlet, open at bottom for the admission and escape of water, and a passage placing the upper portion of the valve in communication with the atmosphere, the arrangement being such that when the valve is once unseated its buoyancy holds it so until it is filled with water, which enters it at bottom and expels the air through the air-passage, whereupon it reseats itself and the water escapes from its interior through its open bottom and into the discharge-opening.

The object of the present invention is to provide a valve of this class of improved construction, and especially to bring within convenient reach the auxiliary valve for controlling the escape of air from the hollow valve.

To this end the invention consists in the features of novelty that are particularly pointed out in the claims hereinafter.

In the drawings, A represents a tank or reservoir having at bottom a discharge-opening surrounded by a valve-seat B, which preferably flares upward, and C is a discharge-pipe communicating with the discharge-opening for conveying the water to the point where it is desired for use.

D represents the hollow valve proper, which may be of any desired construction, but is preferably constructed in one or the other of the two ways shown in the drawings. In Fig. 1 it is shown as consisting of a hollow bulb D' open at bottom for the admission and escape of water, and a tube $D^2$, which extends from about the bottom of the bulb upward through it, terminating some distance above it. The upper end of the tube is closed air-tight by a cap E, and where the tube passes through the top of the bulb an air-tight joint is made by soldering or in any suitable way, so that the valve constructed of these parts is air-tight, save at bottom. The bottom of the tube is connected to the bulb by means of a spider F, so as to prevent their relative movement. The tube is provided with an opening J, located within the bulb and near the top thereof, so as to place the interior of the tube and upper portion of the bulb in communication with each other.

G is a rod attached to the cap E. $g\ g'$ are nuts or collars thereon. H is a lever fulcrumed to the tank and having at one end a perforation through which the rod G passes, and I is a pull-chain attached to the other end of the lever and depending within convenient reach. A pull upon the chain causes the lever to come in contact with the collar $g$ and lifts the valve, and the collar $g'$, by coming in contact with the under side of the lever, limits the upward movement of the valve.

K is a tube, the upper portion of which is in communication with the upper portion of the hollow valve, whence it extends downward through said valve, past the bottom thereof, thence through the side of the discharge-pipe, and into the space between the double bottoms $a$ and $a'$ of the tank, and thence downward through the bottom $a$, terminating in communication with the atmosphere. To the outer end of this tube is applied a screw-cap L, and in the side of the tube is an opening $l$, the arrangement being such that by adjusting the cap the opening $l$ may be either completely closed or opened to any desired extent for the purpose of regulating the flow of air through it. This tube is of such diameter that it nearly fills the tube $D^2$ and serves to guide the float in its vertical movements.

The valve shown in Fig. 2 does not differ from the one shown in Fig. 1, excepting that the tube $d^2$ (corresponding with the tube $D^2$) terminates at the top of the bulb instead of being carried downward through it to the bottom thereof, and in this case the spider $f$ embraces the tube K loosely, so as to guide the valve in its vertical movement.

The operation is as follows: While the valve is seated it is filled with air and is in communication with the discharge-pipe C through its open bottom and with the atmosphere through the tube K. When raised to the position indicated by dotted lines in Fig. 1, its buoyancy will hold it so until, by reason of the entrance of water and the expulsion of air, it no longer displaces a body of water whose weight is greater than its own, whereupon it will be reseated by gravity. This takes place before the water rises within it to the level of the upper end of the tube K. It will of course be understood that unless this were so it would not reseat until the entire contents of the tank had been discharged, because the water would flow out through the tube K as fast as it entered at the bottom of the float. The tube $D^2$ constitutes, in fact, only a contracted upward extension of the bulb, and its object is to enable the use of a bulb of minimum size.

What I claim as new, and desire to secure by Letters Patent, is—

1. In a flushing attachment, the combination of a tank having a discharge-opening, a hollow valve adapted to close said opening, the valve being air-tight at top and open at bottom for the admission and escape of water, means for lifting the valve, and a tube communicating at one end with the upper part of the valve, whence it extends downward through the valve, past the bottom thereof, and communicates with the atmosphere, substantially as set forth.

2. In a flushing attachment, the combination of a tank having a discharge-opening, a hollow valve adapted to close said opening, the valve being air-tight at top and open at bottom for the admission and escape of water, means for lifting said valve, a tube communicating at one end with the upper part of the valve whence it extends downward through the valve, past the bottom thereof, and at its other end communicates with the atmosphere, and a valve in the projecting end of said tube for regulating the flow of air through it, substantially as set forth.

3. In a flushing attachment, the combination of a tank having a discharge-opening, a hollow valve adapted to close said opening, the valve being air-tight at top and open at bottom for the admission and escape of water, means for lifting the valve, and a fixed tube communicating at one end with the atmosphere and extending upward through the bottom of the valve and terminating within it at a level above the level to which the water rises, substantially as set forth.

4. In a flushing attachment, the combination of a tank having a discharge-opening, a hollow valve adapted to close said opening, the valve being air-tight at top and open at bottom for the admission and escape of water, means for lifting the valve, a fixed tube communicating at one end with the atmosphere and extending upward through the bottom of the valve and terminating within it at a point above the level to which the water rises, and a device interposed between the tube and valve whereby the tube guides the valve in its vertical movements, substantially as set forth.

5. In a flushing attachment, the combination of a tank having a discharge-opening, a hollow valve adapted to close said opening, the valve being air-tight at top and open at bottom for the admission and escape of water, and consisting of a hollow bulb having at top a hollow, contracted, upward extension, means for lifting the valve, and a tube communicating at one end with the atmosphere and extending upward through the bottom of the valve, terminating at its upper end within the contracted extension aforesaid, substantially as set forth.

6. In a flushing attachment, the combination of a tank having a discharge-opening, a hollow valve adapted to close said opening, the valve being air-tight at top and open at bottom for the admission and escape of water, and consisting of a hollow bulb, a tube fixed to and extending upward within the bulb, the upper portion of the bulb being in communication with the interior of the tube, and a second tube communicating at one end with the atmosphere and extending upward through the bottom of the valve and into the first-named tube, substantially as set forth.

7. In a flushing attachment, the combination of a tank having a discharge-opening, a hollow valve adapted to close said opening, the valve being air-tight at top and open at bottom for the admission and escape of water, and consisting of a hollow bulb, a tube extending from the bottom portion of the bulb upward through it and terminating some distance above it, said tube having an opening by which its interior is placed in communication with the upper portion of the bulb, and a second tube communicating at one end with the atmosphere and extending upward through the bottom of the valve, terminating in that portion of the first-named tube which projects above the top of the bulb, substantially as set forth.

8. In a flushing attachment, the combination with a tank having a discharge-opening, of a hollow valve adapted to close said opening, said valve consisting of a bulb D' open at bottom for the admission and escape of water, the tube $D^2$ extending from the bottom portion of the bulb upward through it and terminating some distance above it, said tube being closed at its upper end and having an opening J by which it communicates with the upper portion of the bulb, and the spider F connecting the lower end of the tube with the bulb, and a second tube K communicating at one end with the atmosphere and extending upward through the bottom of the bulb and into the tube $D^2$, terminating at a level above the top of the bulb, substantially as set forth.

PATRICK J. MADDEN.

Witnesses:
L. M. HOPKINS,
S. E. SHARON.